(12) United States Patent
Cannon

(10) Patent No.: US 7,447,854 B1
(45) Date of Patent: Nov. 4, 2008

(54) TRACKING AND REPLICATING CHANGES TO A VIRTUAL DISK

(75) Inventor: Anthony Cannon, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 429 days.

(21) Appl. No.: 11/323,203

(22) Filed: Dec. 30, 2005

(51) Int. Cl.
*G06F 12/00* (2006.01)

(52) U.S. Cl. ...................................... 711/162
(58) Field of Classification Search ........................ None
See application file for complete search history.

(56) References Cited

U.S. PATENT DOCUMENTS

| | | | |
|---|---|---|---|
| 5,721,907 A | 2/1998 | Pyne | |
| 6,101,507 A | 8/2000 | Cane | |
| 6,442,570 B1 * | 8/2002 | Wu | 707/201 |
| 6,694,335 B1 * | 2/2004 | Hopmann et al. | 707/201 |
| 7,103,796 B1 * | 9/2006 | Kekre et al. | 714/6 |
| 2003/0188114 A1 * | 10/2003 | Lubbers et al. | 711/162 |
| 2005/0251633 A1 * | 11/2005 | Micka et al. | 711/162 |
| 2005/0262166 A1 * | 11/2005 | Rajeev et al. | 707/204 |
| 2006/0161808 A1 * | 7/2006 | Burkey | 714/6 |
| 2007/0022263 A1 * | 1/2007 | Fandel et al. | 711/162 |
| 2007/0100909 A1 * | 5/2007 | Padovano et al. | 707/204 |

OTHER PUBLICATIONS

Tridgell, A. "Efficient Algorithms for Sorting and Synchronization", The Australian National University, Feb. 1999.

* cited by examiner

*Primary Examiner*—Hiep T Nguyen

(57) ABSTRACT

A mechanism is provided to maintain multiple copies of a virtual disk associated with a virtual machine by a synchronization function. The content of a first virtual disk is maintained, as a copy, at a second virtual disk by maintaining a record of the changes made to the first virtual disk and transferring only the changed data to the second. A disk change map represents the changed portions of the first virtual disk and is used to determine the content that must be transferred. Only data that differs between the two virtual disks is transferred thereby reducing the amount of data that needs to be transmitted.

40 Claims, 9 Drawing Sheets

| MDCM 500-1 | | |
|---|---|---|
| DB | Changed | Hash |
| 1 | | |
| 2 | | |
| 3 | | |
| N-2 | | |
| N-1 | | |
| N | | |

FIG. 8

| SVM 500-2 | | |
|---|---|---|
| DB | Changed | Hash |
| 1 | | |
| 2 | | |
| 3 | | |
| N-2 | | |
| N-1 | | |
| N | | |

FIG. 8A

| 500-3 | | | |
|---|---|---|---|
| DB | Changed | Hash | Time Stamp |
| 1 | | | |
| 2 | | | |
| 3 | | | |
| N-1 | | | |
| N | | | |

FIG. 8B

TRACKING AND REPLICATING CHANGES TO A VIRTUAL DISK

FIELD OF THE INVENTION

This invention relates to virtual computer systems, and, in particular, to a system and method for synchronizing a virtual storage device on an active virtual machine with a virtual storage device on another virtual machine.

BACKGROUND OF THE INVENTION

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, because the virtualization can isolate potentially unstable or unsafe software so that it cannot adversely affect the hardware state or system files required for running the physical (as opposed to virtual) hardware.

The advantages of various types of synchronizing storage systems are also widely recognized, such as providing a backup of some aspect of a computer system and providing the ability to revert back to a previously generated point to undo changes to some aspect of a computer system or to recover from a failure affecting the computer system. One particular use of synchronizing that is advantageous is to allow for operation in different locations where work that is performed on one system is available to another to define a point of commonality.

SUMMARY OF THE INVENTION

A synchronization mechanism is provided to efficiently maintain a copy of a first virtual disk associated with a first virtual machine at a second virtual machine on a corresponding second virtual disk. The first virtual disk is organized into blocks that correspond to portions of the first virtual disk. A disk change map identifies the blocks of the first virtual disk that have changed by a write access since the last synchronization. In one embodiment, only the data that corresponds to the changed blocks are sent for commitment to the second virtual disk to synchronize the second virtual disk with the first virtual disk.

In another embodiment, the data that corresponds to the changed blocks on the first virtual disk is only sent if that data differs from the data already present on the corresponding blocks on the second virtual disk thereby reducing the amount of data that needs to be transmitted.

A hash algorithm is used to determine similarities between data on the first and second virtual disks.

In one embodiment, a method of synchronizing a first virtual disk (VD) with a second virtual disk comprises: identifying one or more blocks of the first virtual disk that have been written to since a last synchronization event; transmitting data to the second VD, from the first VD, the transmitted data corresponding to each identified one or more blocks of the first VD; receiving the transmitted data from the first VD; and committing the data received from the first VD to the second VD.

In another embodiment, the first VD comprises a plurality of sectors and each block corresponds to one or more sectors and a record of blocks that correspond to at least one sector that has been written to since the last synch event is maintained.

The second VD comprises a second plurality of sectors that correspond directly with the sectors of the first VD and the data received from the first VD is committed, or written, to corresponding sectors on the second VD.

In another embodiment, for each identified block it is determined whether the corresponding data is the same as data that has already been transmitted for another identified block, and if the data is a duplicate, an indication of the another identified block is sent instead of the corresponding data.

In yet another embodiment of synchronizing a first virtual disk (VD) on a first virtual machine (VM) with a second virtual disk on a second VM, wherein each of the first and second VD comprises a plurality of sectors, the sectors on the first VD being in a direct corresponding relationship with the sectors on the second VD, the method comprises: maintaining a first record of a plurality of entries corresponding to a plurality of blocks, where each block corresponds to one or more sectors of the first VD; marking a first record entry for the corresponding block for each sector in the first VD that has been written to since a last synch event; upon initiation of a current synch event, transmitting the first record from the first VM to the second VM; receiving, from the second VM, additional information regarding each of the one or more marked entries in the first record; and for each marked entry: the first VM determines, as a function of the respective additional information, whether or not to send data from the first VD, from the one or more sectors corresponding to the specific block for the entry, to the second VM.

Determining the additional information comprises: for each marked entry in the first record, calculating a second VD hash value over the data in the sectors of the second VD corresponding to the block in the marked entry, and returning the calculated second VD hash values to the first VM. Determining whether or not to send data from the first VD from the one or more sectors corresponding to the specific block to the second VM comprises: for each marked entry in the first record, calculating a first VD hash value over the data in the sectors of the first VD corresponding to the block in the marked entry, comparing the first VD hash value to the second VD hash value and if the first and second VD hash values are not equal, sending the data from the first VD from the one or more sectors corresponding to the specific block to the second VM.

In one embodiment, initiating the current synch event comprises: monitoring a cumulative amount of data represented by sectors corresponding to the blocks in the marked first record entries; comparing the cumulative amount of data to a threshold level; and if the cumulative amount of data is not less than the threshold, initiating the current synch event.

The threshold is a function of at least one of: a maximum amount of data that can be transmitted; a bandwidth value of a connection between the first and second VM; an amount of time in which the synchronization must be completed; a first time of day at which the synchronization must be started; and a second time of day by which the synchronization must be completed.

In another embodiment a system for synchronizing a first virtual disk (VD) with a second virtual disk comprises: a first memory containing a master synch program; a second memory containing a slave synch program; a first processor operative to execute said master synch program; and a second processor operative to execute said slave synch program. Said master synch program comprises: program code for identifying one or more blocks of the first virtual disk that have been written to since a last synchronization event; and program code for transmitting data to the second VD, from the first VD, the transmitted data corresponding to each identified one or more blocks of the first VD. Said slave synch program comprises: program code for receiving the transmitted data from the first VD; and program code for committing the data received from the first VD to the second VD.

The first VD may comprise a plurality of sectors and each block corresponds to one or more sectors, the master synch program further comprising: program code for maintaining a record of blocks that correspond to at least one sector that has been written to since the last synch event.

BRIEF DESCRIPTION OF THE DRAWINGS

FIGS. 8, 8A and 8B are alternate embodiments of the disk change maps in accordance with various embodiments of the present invention;

DETAILED DESCRIPTION

Figure 1:
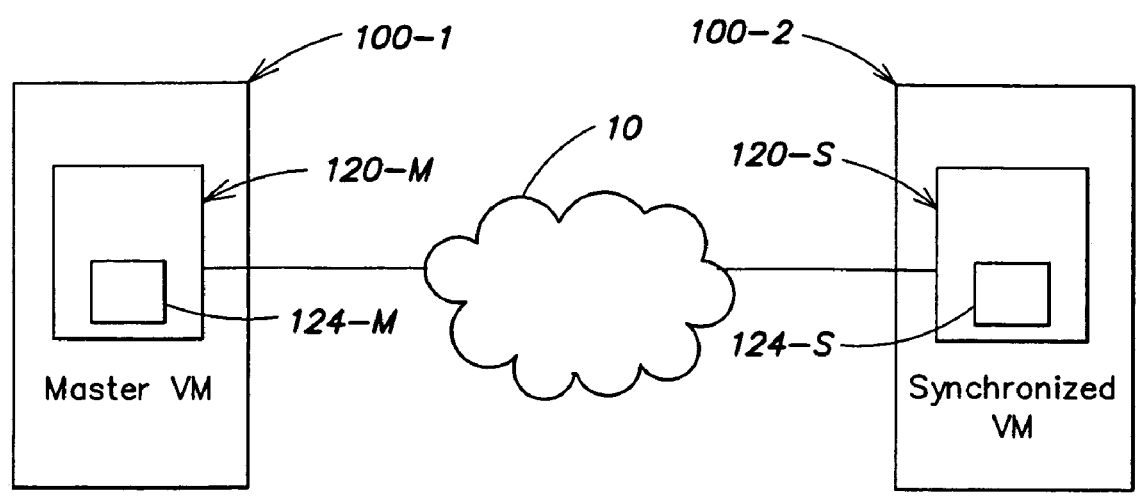
FIG. 1 illustrates a first virtual computer system and a second virtual computer system in networked communication with one another.

The invention is herein described, by way of example only, with reference to the accompanying drawings. It is stressed that the particulars shown are by way of example and for purposes of illustrative discussion of the various embodiments of the present invention only, and are presented in the cause of providing, what is believed to be, the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description and should not be regarded as limiting.

It is appreciated that certain features of the invention, which are, for the sake of clarity, described in the context of separate embodiments, may also be provided in combination in a single embodiment. Conversely, various features of the invention, which are, for brevity, described in the context of a single embodiment, may also be provided separately or in any suitable subcombination.

This invention may be implemented in a wide variety of virtual computer systems, based on a wide variety of different physical computer systems. An embodiment of the invention is described in connection with a specific virtual computer system simply as an example of implementing the invention. The scope of the invention should not be limited to, or by, the exemplary implementation.

The present invention, as will be discussed below in more detail, provides a mechanism to efficiently maintain multiple copies of a virtual disk for a virtual machine by a synchronization function. The present invention can be leveraged to provide a number of solutions including, but not limited to, disaster recovery and virtual machine migration.

The various embodiments of the present invention will be discussed with respect to a system as shown in FIG. 1 where a first virtual computer system 100-1 and a second virtual computer system 100-2 are in networked communication with one another through a network 10. The network 10 may be any one of known networks including the Internet, LAN, WAN or even wireless network communication protocols. Further, network 10 may be a bus or pathway between components on the same computer system, for example, the USB protocol, firewire, serial or parallel busses. A master virtual machine 120-M is resident on the first virtual computer system 100-1 and includes a master virtual disk 124-M. A synchronized virtual machine 120-S is resident on the second virtual computer system 100-2 and has a corresponding virtual disk 124-S. In some aspects, the synchronized virtual machine 120-S may be considered a "slave" to the master virtual machine.

Various embodiments of the present invention are directed to keeping the two virtual disks 124-M, 124-S in synchronization. In this situation it is desirable that the virtual disk contents be identical, although different internal formats may be used to store those contents, for example, an encrypted virtual disk versus a non-encrypted virtual disk. In other words, two virtual disks are considered identical if their contents, as read by a respective virtual machine, are identical regardless as to how the virtual disks are stored on the physical machine. The relationship between the various components of a virtual machine and its respective virtual computer system, are described in detail below.

As an overview, and one which will be elaborated on in more detail below, to minimize an amount of data that must be copied to keep the virtual disk in synchronization, a layer is inserted into the virtual disk device stack to track all writes to the disk by recording which blocks have been changed in a disk change map. Periodically, either the virtualization or an external agent, in one embodiment, determines which blocks have been changed from the disk change map and copies the data corresponding to those blocks to the second disk. Entries are removed from the disk change map when the writes have been committed to the second disk, assuming no new writes have taken place between the time the copy was scheduled and the time it completes. The contents of the disk will be considered synchronized when the disk change map is empty or indicates that there are no changed blocks.

To "commit" a write to the disk represents that the "writes" to the second disk have actually reached the physical media. There may be many layers in a given operating system that might store the data temporarily before a write "hits" the disk (including but not limited to user level application buffering and the operating system internal write cache.) In the case of a catastrophic system failure, e.g., a power disruption, the contents of these intermediate buffers will be lost. Therefore, clearing an entry in the disk change map upon, for example, initiation of the write operation, and not upon confirmation of commitment, may result in the two disks being different due to a failure of the write operation to complete, i.e., commit.

Advantageously, the present invention tracks changes to the disk content directly and eliminates the need to pre-process the virtual disk.

Further, tracking changes to the virtual disk file itself is not the same as tracking changes to the virtual disk contents. A guest write to one virtual disk sector may actually write to several sectors in the virtual disk file; one to write the sector and one or more to update the meta-data for that sector. Thus, tracking the virtual disk file externally will often result in copying at least as much as tracking internally, and usually more. At most, external tracking insures that the virtual disk files themselves are in synchronization; external tracking cannot be used to synchronize the contents of two virtual disks that are stored in different formats. Thus, for example, it is not possible to update an unencrypted copy of a virtual disk from an encrypted copy of a virtual disk. The present invention provides for synchronization by tracking virtual disk writes initiated by the guest as opposed to virtual disk file writes initiated by the host.

In order to facilitate understanding of the various embodiments of the present invention, the following is a general discussion of a virtual machine in which one or more of the embodiments of the present invention may be implemented.

Figure 2:
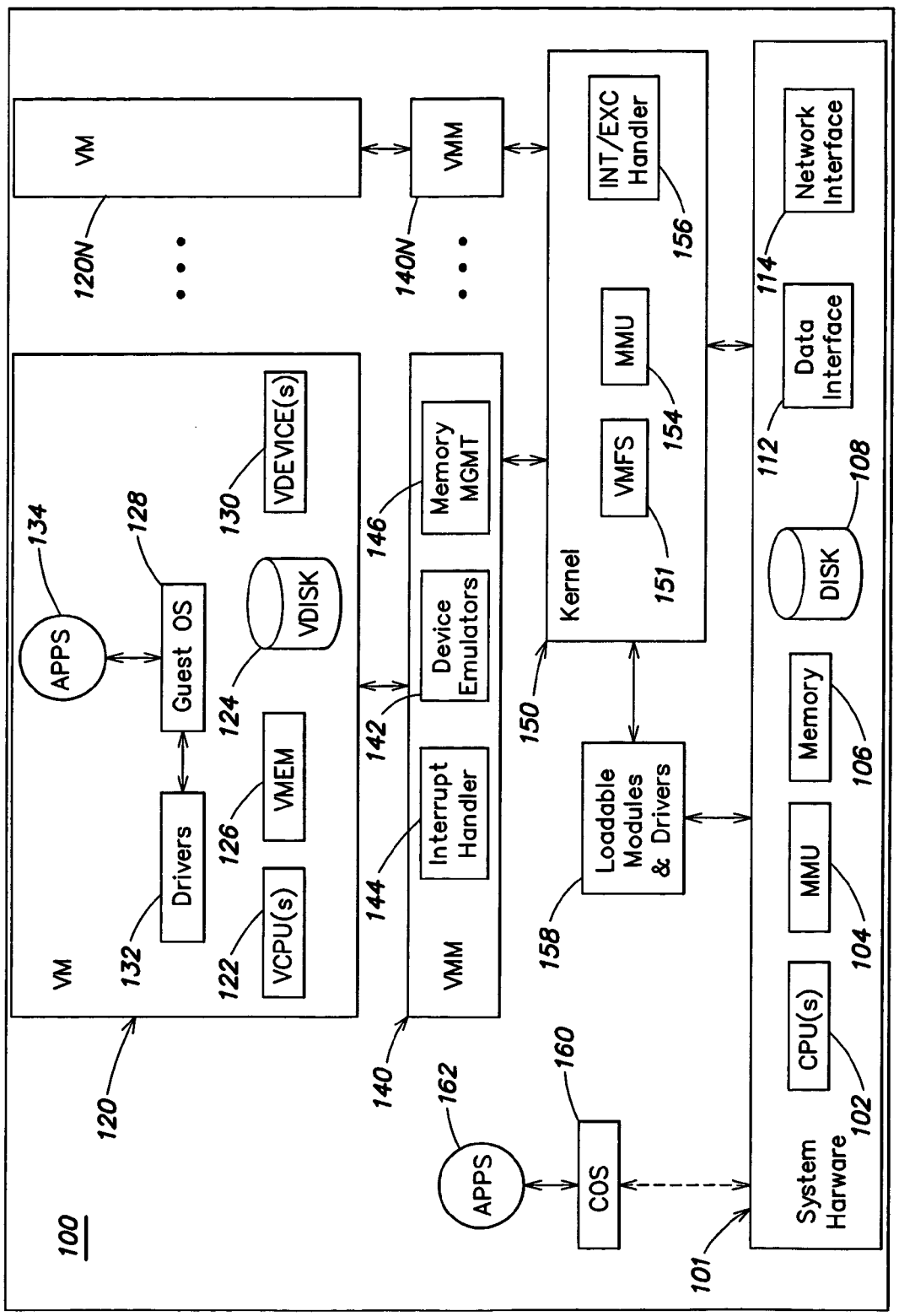
FIG. 2 is a block diagram illustration of the components of a kernel-based, virtualized computer system.

As is known in the field of computer science, a virtual machine (VM) is a software abstraction—a "virtualization"—of an actual physical computer system. FIG. 2 shows one possible arrangement of a computer system 100 that implements virtualization. A virtual machine (VM) 120, which in this system is a "guest," is installed on a "host platform," or simply "host," which will include system hardware 101, that is, a hardware platform, and one or more layers or co-resident components comprising system-level software, such as an operating system (OS) or similar kernel, a virtual machine monitor or hypervisor (see below), or some combination of these.

It should be noted that the arrangement of the components shown in FIG. 2 is presented in order to facilitate the description of the present invention. The relative arrangement of the components is not meant to be limiting. One of ordinary skill in the art will understand that those components shown as being separate from one another, for example, the drivers 132 relative to the guest OS 128, could just as easily be shown as one being part of the other. The embodiments of the present invention are not limited by the arrangement of components shown in these block diagrams.

As software, the code defining the VM will ultimately execute on the actual system hardware 101. As in almost all computers, this hardware will include one or more CPUs 102, some form of memory 106 (volatile or non-volatile), one or more storage devices such as one or more disks 108, and one or more devices.

Many different hardware devices may be used in different systems. Examples include one or more interface cards for interfacing with external devices, computers, systems and/or networks. For example, the hardware 101 may include a data interface 112 for connecting to an external data storage device, system or network. As a more specific example, the data interface 112 may be one or more conventional host bus adapters (HBAs) for connecting to a conventional storage area network (SAN). Also, the hardware 101 may include a network interface 114 for connecting to a computer network. More specifically, the network interface 114 may be, for example, one or more conventional Ethernet controllers or network interface cards (NICs) for connecting to a conventional Ethernet network, which may further be connected to one or more additional networks of varying types.

In many existing virtualized systems, the hardware processor(s) 102 are the same as in a non-virtualized computer with the same platform, for example, the Intel x-86 platform. Because of the advantages of virtualization, however, some hardware vendors have proposed, and are presumably developing, hardware processors that include specific hardware support for virtualization.

Each VM 120 will typically mimic the general structure of a physical computer and as such will usually have both virtual system hardware and guest system software. The virtual system hardware typically includes at least one virtual CPU 122, virtual memory 126, at least one virtual disk 124, and one or more virtual devices 130. Note that a storage disk—virtual 124 or physical 108—is also a "device," but is usually considered separately because of the important role it plays. All of the virtual hardware components of the VM may be implemented in software to emulate corresponding physical components. The guest system software includes a guest operating system (OS) 128 and drivers 132 as needed, for example, for the various virtual devices 130.

To permit computer systems to scale to larger numbers of concurrent threads, systems with multiple CPUs have been developed. Many conventional hardware platforms therefore include more than one hardware processor 102. In many such platforms, each processor is a separate "chip" and may share system resources such as main memory and/or at least one I/O device. "Multi-cored" architectures have also been developed (for example, IBM POWER4 and POWER5 architectures, as well as the Sun UltraSparc IV), in which more than one physical CPU is fabricated on a single chip, with its own set of functional units (such as a floating-point unit and an arithmetic/logic unit ALU), and can execute threads independently. Multi-cored processors typically share only very limited resources, such as cache.

Still another modern technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB). One example of a multi-threaded architecture is Intel Corporation's "Hyper-Threading Technology," used to improve the performance of its Pentium IV and Xeon processor lines. Although not now commercially available, it would also be possible to have an architecture that is both multi-cored and multi-threaded.

Similarly, a single VM may also have (that is, be exposed to) more than one virtualized processor. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs.

If the VM 120 is properly designed, applications 134 running on the VM will function as they would if run on a "real" computer, even though the applications are running at least partially indirectly, that is via the guest OS 128 and virtual processor(s). Executable files will be accessed by the guest OS from the virtual disk 124 or virtual memory 126, which will be portions of the actual physical disk 108 or memory 106 allocated to that VM. Once an application is installed within the VM, the guest OS retrieves files from the virtual disk just as if the files had been pre-stored as the result of a conventional installation of the application. The design and operation of virtual machines in general are known in the field of computer science.

Some interface is usually required between a VM 120 and the underlying host platform (in particular, the hardware CPU(s) 102 and any intermediate system-level software layers), which is (are) responsible for actually submitting and executing VM-issued instructions and for handling I/O operations, including transferring data to and from the hardware memory 106 and storage devices 108. A common term for this interface or virtualization layer is a "virtual machine monitor" (VMM), shown as component 140. A VMM is usually a software component that virtualizes at least some of the resources of the physical host machine, or at least some hardware resource, so as to export a hardware interface to the VM corresponding to the hardware the VM "thinks" it is running on. As FIG. 2 illustrates, a virtualized computer system may (and usually will) have more than one VM (120, ..., 120N), each of which may be running on its own VMM (140, ..., 140N)

The various virtualized hardware components in the VM, such as the virtual CPU(s) 122, etc., the virtual memory 126, the virtual disk 124, and the virtual device(s) 130, are shown as being part of the VM 120 for the sake of conceptual simplicity. In actuality, these "components" are often implemented as software emulations included in the VMM. One advantage of such an arrangement is that the VMM may (but need not) be set up to expose "generic" devices, which facilitate, for example, migration of VM from one hardware platform to another.

In contrast to a fully virtualized system, the guest OS 128 in a so-called "para-virtualized" system is modified to support virtualization, such that it not only has an explicit interface to the VMM, but is sometimes also allowed to access at least one host hardware resource directly. In some para-virtualized systems, one of a plurality of VMs plays a "superior" role in that it mediates some requests for hardware resources made by the guest OSs of other VMs. In short, virtualization transparency is sacrificed to gain speed or to make it easier to implement the VMM that supports the para-virtualized machine. In such para-virtualized systems, the VMM is sometimes referred to as a "hypervisor."

In addition to the distinction between full and partial (para-) virtualization, two arrangements of intermediate system-level software layer(s) are in general use—a "hosted" configuration and a "non-hosted" configuration (illustrated in FIG. 2). In a hosted virtualized computer system, an existing, general-purpose operating system forms a "host" OS that is used to perform certain input/output (I/O) operations, alongside and sometimes at the request and direction of the VMM 140. The host OS, which usually includes drivers and supports applications of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 to Bugnion, et al., "System and Method for Virtualizing Computer Systems," 17 Dec. 1202.

In addition to device emulators 142, FIG. 2 also illustrates some of the other components that are also often included in the VMM of either a hosted or non-hosted virtualization system. For example, interrupt and exception handlers 144 may be included to help context-switching, and some form of memory management module 146.

In many cases, it may be beneficial to deploy VMMs on top of a software layer—a kernel 150—constructed specifically to provide efficient support for the VMs. This configuration is frequently referred to as being "non-hosted." Compared with a system in which VMMs run directly on the hardware platform, use of a kernel offers greater modularity and facilitates provision of services, for example, resource management, that extend across multiple virtual machines.

Compared with a hosted deployment, a kernel may offer greater performance because it can be co-developed with the VMM and be optimized for the characteristics of a workload consisting primarily of VMs/VMMs. The kernel 150 also handles any other applications running on it that can be separately scheduled, as well as any temporary "console" operating system (COS) 160 "service console," which is analogous to "service processor" hardware for performing setup and diagnostic functions. In such implementations, the kernel 150 also includes a remote procedure call (RPC) mechanism to enable communication between, for example, the VMM 140 and any applications 162 installed to run on the COS 160. In some systems, the COS 160 is included to boot the system as a whole and to enabling certain user interactions with the kernel, as well as for running certain applications 162 when execution is enabled in the context of COS 160. One example of a non-hosted, virtualized computer system is described in U.S. Pat. No. 6,961,941 to Nelson, et al., "Computer Configuration for Resource Management in Systems Including a Virtual Machine," 1 Nov. 1205.

This invention may be used to advantage in both a hosted and a non-hosted virtualized computer system, in which the included virtual machine(s) may be fully or para-virtualized, and in which the virtual machine(s) have any number of virtualized processors, which may be of any type including, but not limited to, multi-cored, multi-threaded, or some combination thereof.

As in most modern computers, the address space of the memory 106 is partitioned into pages (for example, in the Intel x86 architecture) or other analogous units. Applications then address the memory 106 using virtual addresses (VAs), which include virtual page numbers (VPNs). The VAs are then mapped to physical addresses (PAs) that are used to address the physical memory 106. (VAs and PAs have a common offset from a base address, so that only the VPN needs to be converted into a corresponding physical page number (PPN).) The concepts of VPNs and PPNs, as well as the way in which the different page numbering schemes are implemented and used, are well known. Similar mappings are used in other architectures where relocatability is possible.

An extra level of addressing indirection is typically implemented in virtualized systems in that a VPN issued by an application 134 in the VM 120 is remapped twice in order to determine which page of the hardware memory is intended. The first mapping is provided by a mapping module within the guest OS 128, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 146, located typically in the VMM 140, performs the second mapping by taking the GPPN issued by the guest OS 128 and mapping it to a hardware (or "machine") page number PPN that can be used to address the hardware memory 106. This GPPN-to-PPN mapping may instead be done in the main system-level software layer (such as in a mapping module in a kernel 150, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

The kernel 150 includes a memory management module 154 that manages all machine memory that is not allocated exclusively to the COS 160. When the kernel 150 is loaded, the information about the maximum amount of memory available on the machine is available to the kernel, as well as information about how much of it is being used by the COS. Part of the machine memory is used for the kernel 150 itself and the rest is used for the virtual machines.

Virtual machines use machine memory for two purposes. First, memory is used to back portions of each VM's memory region, that is, to store code, data, stacks, etc., in the VMM page table. For example, the code and data for the VMM 140 is backed by machine memory allocated by the kernel 150. Second, memory is used for the guest memory of the virtual machine. The memory management module may include any algorithms for dynamically allocating memory among the different VM's 120.

In one embodiment of the invention, the kernel 150 is responsible for providing access to all devices on the physical machine. In addition to other modules that the designer may choose to load onto the system for access by the kernel, the kernel will therefore typically load conventional drivers as needed to control access to devices. Accordingly, FIG. 2 shows a module 158 containing loadable kernel modules and drivers. The kernel 150 may interface with the loadable modules and drivers in a conventional manner, using an application program interface (API) or similar interface.

In the ESX Server product of VMware, Inc., the kernel 150 includes a fast, simple file system, referred to here as the VM kernel file system (VMFS 151), that has proven itself to be particularly efficient for storing virtual disks 124, which typically comprise a small number of large (at least 1 GB) files. By using very large file system blocks, the file system is able to keep the amount of metadata (that is, the data that indicates where data blocks are stored on disk) needed to access all of the data in a file to an arbitrarily small size. This allows all of the metadata to be cached in main memory so that all file system reads and writes can be done without any extra metadata reads or writes.

The VMFS 151 in ESX Server may take up only a single disk partition, or it may span multiple partitions or LUNs (Logical Unit Numbers). When it is created, it sets aside space for the file system descriptor, space for file descriptor information, including the file name, space for block allocation information, and space for block pointer blocks. The vast majority of the partition's space is used for data blocks, whose size is set when the file system is created. The larger the partition size, the larger the block size should be in order to minimize the size of the metadata.

As mentioned earlier, an advantage of the VMFS is that it ensures that all metadata may be cached in high-speed, main system memory. This can be done by using large data block sizes, with small block pointers. Since virtual disks are usually at least one gigabyte in size, using large block sizes on the order of 64 Megabytes will cause virtually no wasted disk space and all metadata for the virtual disk can be cached simultaneously in system memory.

Besides being able to always keep file metadata cached in memory, the other key to high performance file I/O is to reduce the number of metadata updates. Note that the only reason why the VMFS metadata will need to be updated is if a file is created or destroyed, or if it changes in size. Since these files are used primarily for virtual disks (or, for example, for copy-on-write redo logs), files are not often created or destroyed. Moreover, because virtual disks are usually fixed in size upon creation, the file size of a virtual disk does not usually change. In order to reduce the number of metadata updates on a virtual disk to zero, the system may therefore preallocate all data blocks for virtual disks when the file is created.

Figure 3:
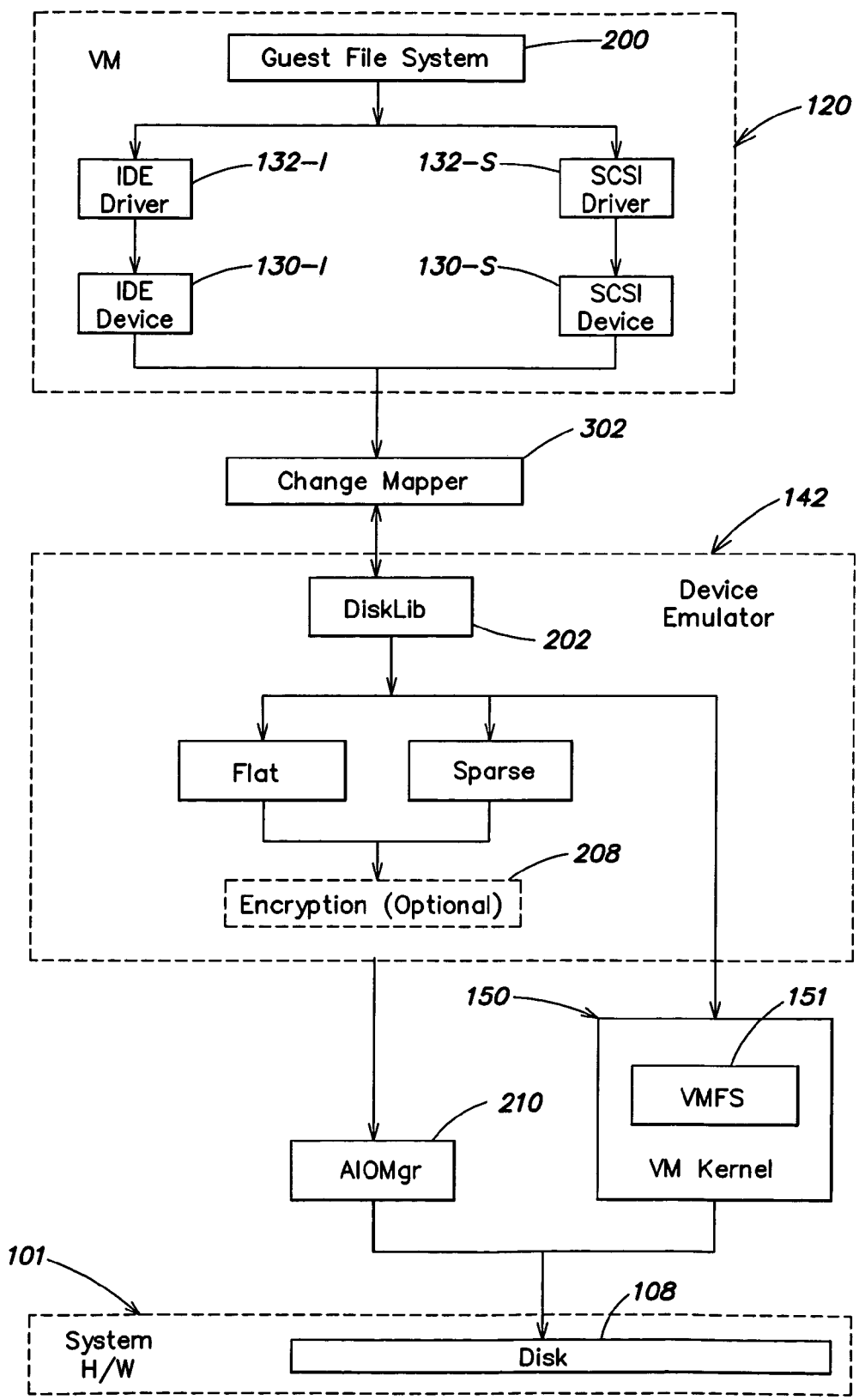
FIG. 3 is a block diagram illustration of the components of a first embodiment of the present invention.

FIG. 3 illustrates selected components of the virtual computer system 101 of FIG. 2, including illustrating some components in greater detail. The components illustrated in these figures are generally the components that are most relevant to implementing the present invention with regard to the initial disk I/O chain. Other components of the system 101 are not illustrated in these figures for simplicity, but the other components of the system may be assumed. FIG. 3 only illustrates the single VM 120, but additional VMs may also be assumed.

At the highest level, FIG. 3 illustrates the VM 120, the device drivers 142, the kernel 150 and the physical disk 108.

A guest file system 200, implemented as part of the virtual machine 120, directs read and write requests to, for example, an IDE driver 132-I or SCSI driver 132-S device driver, depending upon the format of the request. The requests are then, respectively, directed to corresponding virtual devices, IDE device 130-I or SCSI device 130-S.

The devices 130-I, 130-S communicate with a DiskLib process 202 to perform the actual requests. In general, a read or write request consists primarily of a sector offset, a length in sectors, and a scatter-gather list of buffers that contain the data for the write or serve as storage for the read request.

The DiskLib process 202 is a library that contains functionality for dealing with virtual disks found in products from VMware, Inc. DiskLib is an interface to a virtual disk that abstracts away the code that implements writes to the virtual disk file behind a generic series of commands, e.g., open, close, read, write, etc. Advantageously, such an interface to a virtual disk allows the virtual device code (130-I and 130-S) to be written in such a way that these devices can be backed by multiple virtual disk types. One skilled in the art would understand that DiskLib is an abstract virtual interface to a virtual disk and a number of backings that implement that interface.

DiskLib 202 dispatches the requests to one of several modules based on the type of virtual disk. In one non-limiting example a read request from a sparse virtual disk is handled differently than a request made to or from a flat or plain virtual disk. As a result, the differences are isolated from the caller by the DiskLib library 202.

One embodiment of the present invention is implemented on a VMware ESX Server available from VMware, Inc. of Palo Alto, Calif. In this implementation, DiskLib 202 isolates the caller from platform differences between VMware ESX Server and hosted products. When implemented on an ESX Server, the I/O request is routed through the kernel 150 by operation of the VMFS 151. Alternately, in unhosted products, the request is optionally routed through an encryption function 208 and onto an AIO manager 210. The AIO manager 210 is an interface that handles issuing and optimizing of a synchronous file access. In either embodiment, the request has been processed on through to the disk 108 in the system hardware 101.

Figures 4, 5:
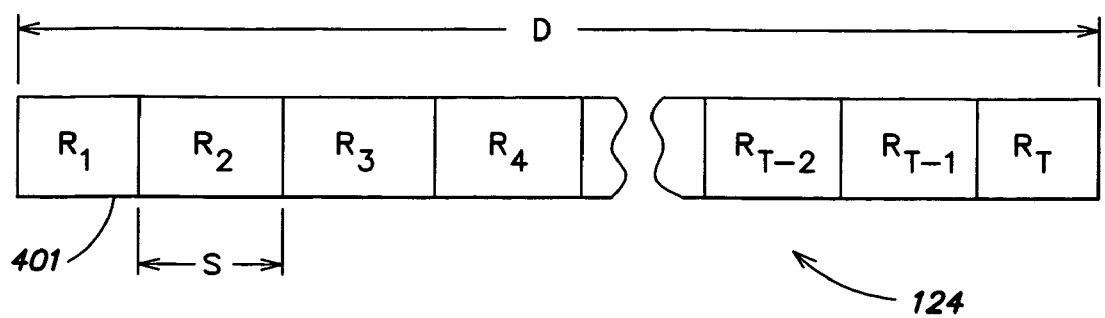
FIG. 4 illustrates a virtual disk as divided into a number of sectors.
FIG. 5 illustrates a disk change map in accordance with an embodiment of the present invention.

Conceptually, a virtual disk 124 can be thought of as having a storage size D divided into a number T of sectors R of a specific sector size S, for example 512 bytes, as represented in FIG. 4. As a result, storage size D=T*S. In general, the virtual disk 124 is written sector by sector and in order to track which sector has been changed, a bit vector, hereinafter referred to as a disk change map (DCM) 500 is implemented.

In one embodiment of the present invention, the disk change map 500 is implemented by defining a block size B that is some multiple M of the virtual disk sector size S, where block size B=M*S. A bit vector V is allocated to contain a number of bits N where N is equal to the size of the virtual disk D divided by the block size B, thus the number of bits N=D/B. When a sector $R_X$ of the virtual disk 124 changes, the bit for the location defined by X divided by M (X/M) in the bit vector V is set.

There are various considerations to be taken into account when choosing a value for the block size B. A relatively small block size B results in a larger bit vector V but reduces the likelihood of unmodified sectors being identified as having changed due to adjacency to modified sectors. In one embodiment, the block size B in the disk change map would be equal to the sector size S, i.e., M=1. This minimizes the size of the vector while insuring that few unmodified sectors are identified as having been modified.

It is noted, however, that even with small block sizes B, the disk change map 500 is extremely lightweight. Updating the disk change map can be done with almost no overhead compared to the work needed to complete the virtual disk write, and the upper bound on the size of the disk change map is extremely small compared to the size of the virtual disk 124. As a non-limiting example, a 4 gigabyte virtual disk with a block size of 4 kilobytes can be tracked with only 120K of memory. It should be noted that the change map tracks guest writes to the virtual disk and not writes to the backing disk file. As a result, the operation of the disk change map is transparent with all disk types supported by DiskLib and is forward compatible with future virtual disk implementations.

As shown in FIG. 5, a disk change map 500 is, for purposes of ease of explanation and not meant to be limiting, represented as a table having two columns. The leftmost column identifies a specific block B. The entries in the right hand column entitled "Changed" indicate whether the respective block has been changed since the last synchronization operation. In one embodiment each of the entries in the changed column may be initially set to a value of 0 (zero) and flipped to a value of 1 (one) when the corresponding block has been written to. As one of ordinary skill in the art would understand, the values in the changed column may be initially set to a value of 1 (one) and flipped to a value of 0 (zero) to indicate a changed block. The representation of the disk change map 500 as being a table is for explanatory purposes only and is not intended to be limiting. One of ordinary skill in the art would understand that there are numerous other data structures other than a vector or a table that can be implemented to function as the disk change map in accordance with the teachings of the present invention. These other implementations include hardware registers, software registers, objects under an object oriented programming language and the like. Further, the DCM can be considered as a grouping of records or entries, where each record or entry has one or more data fields.

Returning to FIG. 3, a change mapper function 302 hooks into the DiskLib 202 to implement the disk change mapping function. The change mapper 302 monitors write commands for a respective virtual storage device and modifies the bits corresponding to the sectors that are being written to by the write commands being processed by DiskLib 202. As a result, the portions of the virtual disk device that have been changed can be tracked. The change mapper function 302 can be used with any abstract interface to a virtual disk and not just DiskLib 202.

Figure 6:
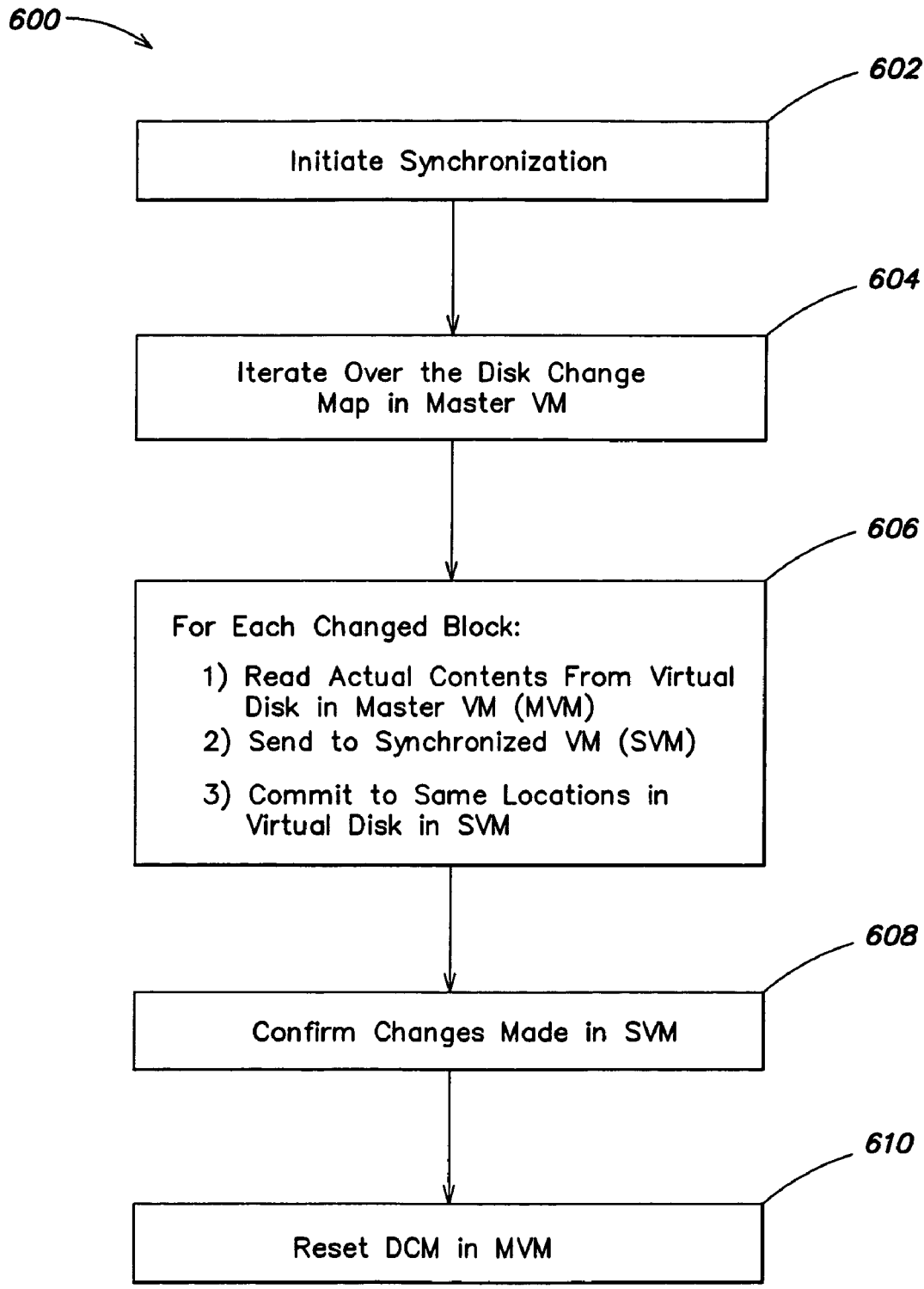
FIG. 6 is a method of operation in accordance with another embodiment of the present invention.

Referring back to FIG. 1, in one embodiment of synchronizing the virtual disk 124-M of the master VM 120-M with the virtual disk 124-S of the synchronized disk 120-S, a synchronization process 600 as shown in FIG. 6 is implemented. In step 602 the synchronization is initiated and an iteration process over the disk change map in the master VM, step 604, is implemented to identify the changed blocks. Subsequently, step 606, for each changed block, the actual contents are read from the virtual disk in the master VM. It should noted that the actual contents for a block in the disk change map may correspond to more than one sector in the virtual disk 124 depending on the value chosen for M. Once the actual contents are retrieved, that data is sent to the synchronized virtual machine 100-2 and committed to the same, i.e., corresponding, locations in the virtual disk in the synchronized virtual machine 100-2. Once the changes in the virtual disk in the synchronized virtual machine are completed, a confirmation of those changes is sent to the master VM, step 608. Upon receipt of the confirmation of changes in the synchronized VM, the DCM in the master VM is reset, step 610. Once all of the data has been committed in the foregoing process 600, the virtual machines are synchronized with respect to the contents of their respective virtual disks.

In alternate embodiments of the present invention, the synchronization process can be optimized. The optimization improvements include, but are not limited to, optimizations to reduce the amount of data transmitted in situations where bandwidth is limited as well as optimizations to avoid the redundant transmission of data.

In one embodiment, the data transmitted by the master to the synchronized virtual machine may be compressed in accordance with any one of a number of well known compression algorithms.

Figure 7:
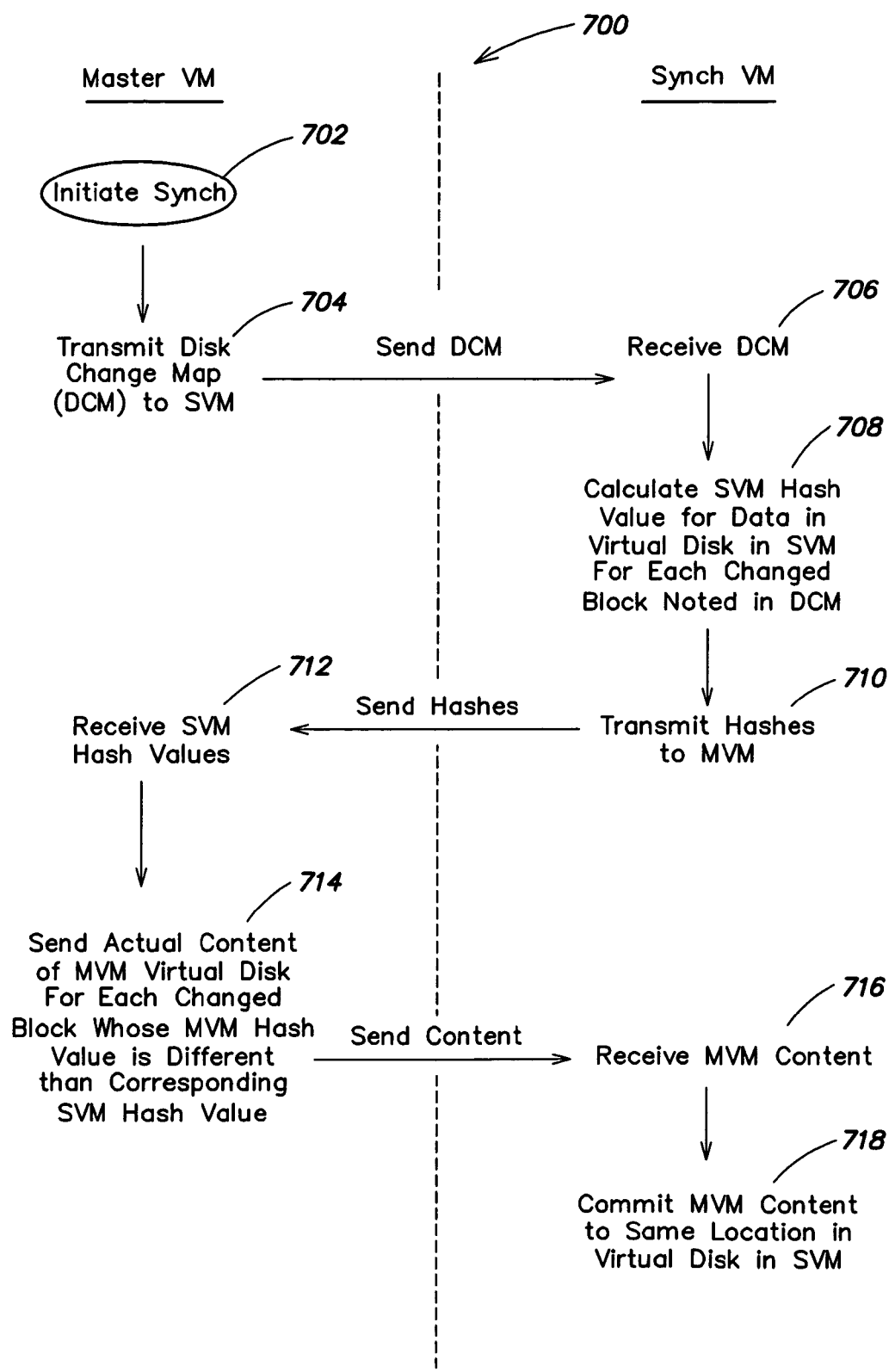
FIG. 7 is a method of operation in accordance with another embodiment of the present invention.

In an alternate embodiment 700, as shown in FIG. 7, the synchronization is initiated at step 702. At step 704 the master disk change map (MDCM) of the master VM 100-1 is transmitted to the synchronized VM 100-2 and received at step 706. At the synchronized VM 100-2, a hash value for the data in the virtual disk 124-S corresponding to each changed block noted in the MDCM is calculated at step 708. One of ordinary skill in the art will understand the functions of a hash value and how a hash value may be calculated. Examples of hash algorithms that may be used in the present invention include, but are not limited to, MD5, SHA-1 and SHA-2, in addition to any other known hash algorithms that provide sufficiently high levels of collision-free attributes. Once the hashes for the data in the virtual disk 124-S are calculated they are transmitted back to the master VM at step 710 and received at step 712. At step 714, the hash values received from the synchronized virtual machine are compared to hash values that have been calculated for the data on the virtual disk 124-M that corresponds to the changed blocks identified in the MDCM. If there is a difference between the hash value calculated for the virtual disk 124-M from that which is calculated for the data in the virtual disk 124-S then that actual content is transmitted from the master VM to the synchronized VM. In other words, actual content is only transmitted if it is determined to differ from what is presently on the virtual disk 124-S at the synchronized VM. At step 716 the actual content is received and at step 718 the received data are committed to the appropriate locations in the virtual disk 124-S of the synchronized VM.

Advantageously, with the process 700 the amount of data corresponding to "false positives," that is transmitted is reduced. A false positive may happen when a block is written to by the virtual machine but the contents do not actually change.

In conjunction with the process 700, a disk change map 500-1, as shown in FIG. 8, may be implemented in the master VM as well as a disk change map 500-2 could be maintained in the synchronized VM as shown in FIG. 8A. As can be seen, an additional column, or another field, in which a hash value corresponds to a block has been added. Once again, the representation as a table is strictly for ease of explanation and is not intended to be limiting.

In another embodiment of the present invention, with respect to the process 700, a hash value for a modified block is stored when the block is modified in the master VM, thus the hash value can be sent to the synchronized VM along with an indication of the block that has been changed. The synchronized VM can then calculate the hash value for its data corresponding to the block and compare it with the hash value received from the master VM. Thus, the determination as to a difference could be done on the synchronized VM and the result returned to the master VM to indicate whether or not the actual content needs to be transmitted back to the synchronized VM. Having the comparison of the hashes done on the synchronized VM relieves the processing burden of the master VM.

In a further embodiment, the master VM will compare a hash for the data corresponding to a block that has already been sent with a hash for data that is about to be sent. If the two hashes match, rather than sending the same data again, a special command can be sent to the synchronized VM instructing it to take the actual data that was sent with respect to a previously sent block and place it in the location corresponding to the subsequent block. This is especially advantageous in a situation where many virtual disk sectors contain the same contents, for example, when the virtual machine zeroes out a large section of the disk.

Alternatively, the synchronized VM can check the hash of the changed block and determine if there is already a block in the synchronized disk change map with the same hash value. If there is, then the data corresponding the block can simply be copied from one portion to the other without needing to transfer it from the master virtual disk. Of course, one of ordinary skill in the art will understand that the hash algorithm will have to be sufficiently robust in order to have confidence in this operation identifying the same data.

In some environments it may be desirable to assure that two or more virtual machines can be synchronized with one another in a specific time interval. As one example, if a worker maintains a virtual machine at her home and a virtual machine at her office, she may wish to guarantee that the two can be synchronized in the time it takes her to travel between the two locations, for example, 30 minutes. This may be advantageous for workers who work from one or more remote locations where the time normally used to travel between them can be used to synchronize the machines thereby allowing a worker to continue to work "where she left off" without having to wait for synchronization or having to instigate it manually. To assure, however, that the synchronization can be completed during an expected commute time, as per this example, one embodiment of the present invention is directed to monitoring various parameters with regard to the synchronization. These parameters include, but are not limited to, the bandwidth available at the time as between the two virtual machines to be synchronized, the amount of data that must be transmitted and the expected availability of a connection.

Figure 9:
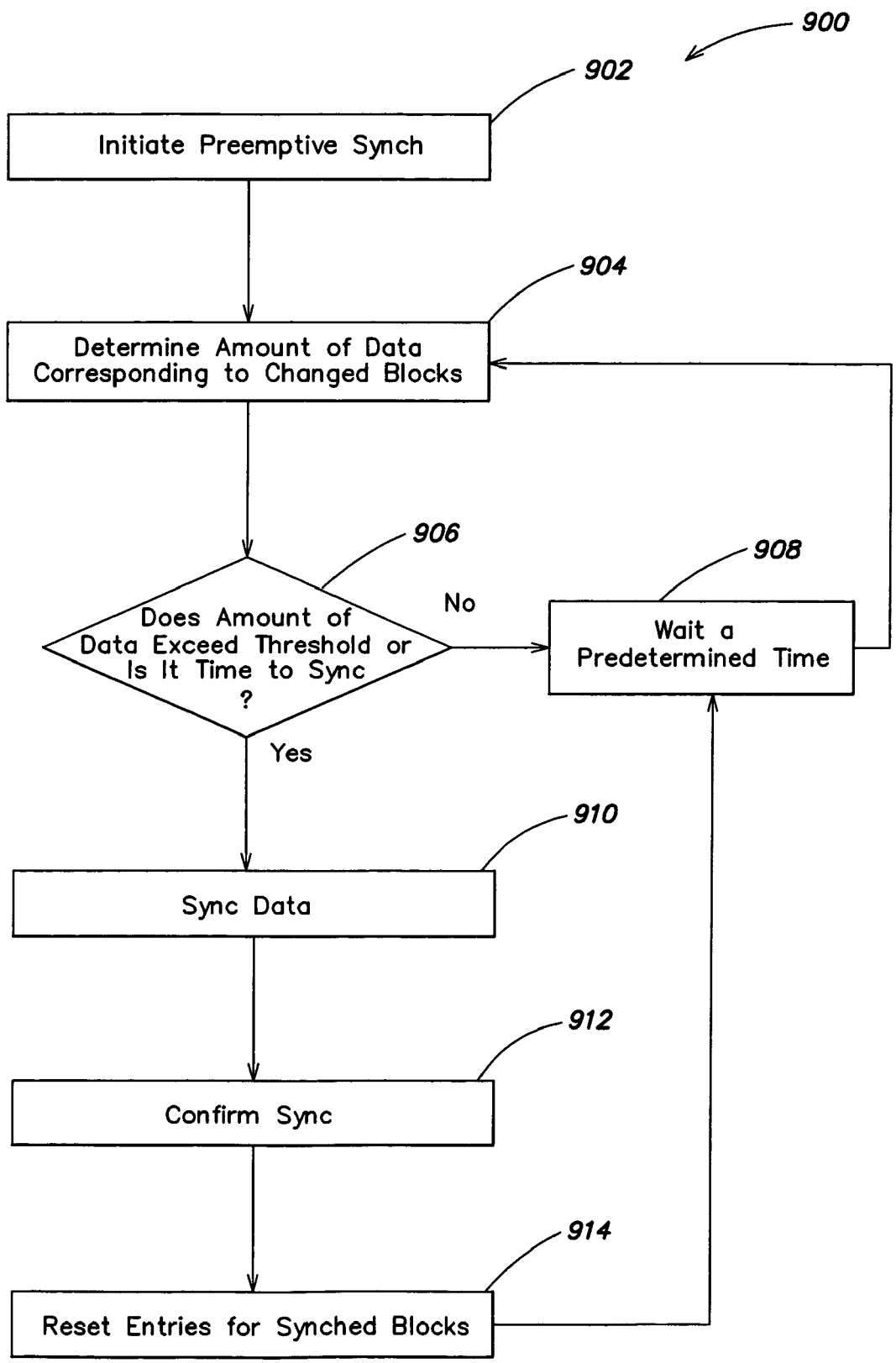
FIG. 9 illustrates a method of operation in accordance with another embodiment of the present invention.

In accordance with one embodiment of the present invention, a preemptive synchronization process 900 begins at step 902 by initiating the preemptive synchronization as shown in FIG. 9. Next, step 904, it is determined how much data that corresponds to the changed blocks would have to be transmitted. This determination could leverage various aspects of the other embodiments described herein with respect to hash codes, using redundant data and the like. At step 906 is it determined if the amount of data that would need to be transmitted exceeds a threshold or if it is time to synchronize. The threshold, as described above, may be a function of various parameters including, but not limited to, bandwidth, accessibility, etc. If the amount of data does not exceed the threshold or it is not time for the synchronization, then control passes to step 908 where the process waits a predetermined time and then returns to step 904.

Returning to step 906, if it is determined that the amount of data does exceed the threshold or it is time for synchronization, control passes to step 910 where the data between the two virtual machines is synchronized in accordance with one or more of the preceding embodiments. At step 912 the synchronization is confirmed and subsequently at step 914 the entries in the master disk change map are reset.

Advantageously by sending some blocks early, the total amount of data that needs to be sent at the time of synchronization can be reduced provided, however, that those blocks do not change again as they would have to be resent if they did. In one modification to the preemptive synchronization, the algorithm should endeavor to transmit the data for blocks that are unlikely to change again. One algorithm would estimate that those blocks that have most recently changed are unlikely to change again within the relevant time period. To aid in this determination, a disk change map 500-3 as shown in FIG. 8B would include an additional column or field that would identify a date and/or timestamp to establish when a corresponding block has changed. The timestamp could then be used to determine which blocks should be prioritized for sending on the assumption that the most recently changed blocks are not going to change again. Of course, an alternate algorithm could establish that those blocks that have changed but are the "oldest" in terms of changed blocks are just as unlikely to change within the relevant time period and those blocks should be prioritized for sending.

Advantageously, the present invention can be used to implement virtual disk file backup operations. While running a virtual machine, the change mapper maintains the disk change map to reflect the modified blocks. The data associated with the changed blocks are periodically sent to, for example, an external agent that will commit those changes to a copy of the virtual disk using a corresponding DiskLib function. Once the change has been committed and acknowledged, the bits for the blocks are cleared. Any virtual disk writes that are received after a transmission for backup, but before an acknowledgement, override any future acknowledgement for that block so that the changed bit will remain set until the next transmission. In this manner, intervening changes to the disk block are not lost.

Similar to virtual disk file backup, disaster recovery procedures may be implemented using the present invention. Building on the foregoing backup scenario, a backup agent may be running as a daemon on some remote storage server. An agent running on, for example, a client, periodically uploads the virtual machine configuration file. Thus, in an event that the client hardware is lost or destroyed, the backup copy of the virtual machine can be redeployed on new hardware. It should be noted that the size of the VM configuration file is greatly dwarfed by the size of the virtual disk. It is, therefore, reasonable to assume that it can be transmitted in a fraction of the time it would take to synchronize the two disks. In addition, if the backup server was an ESX Server available from VMware, Inc. of Palo Alto, Calif., the client could use a remote console to use the server copy of the virtual machine while waiting for replacement hardware.

Further, IT organizations may, on occasion, need to perform maintenance on a user's machine. In some instances, access to the physical machine is required thus necessitating sending an IT professional to the physical machine location. If a user's work environment, however, is stored in a virtual machine, the present invention can be used to implement system maintenance without requiring physical presence or travel.

This centralized image management is accomplished by deploying the virtual machine to a user's physical machine and using the virtual disk file backup features of the present invention to maintain a copy of the virtual machine on a centralized IT storage server system. A user works in a virtual machine that periodically streams changes to the backup maintained by the IT department. Each user also has a system agent running on the host that can restrict access to the virtual machine. When IT needs to perform system maintenance, the remote host agent is instructed to temporarily restrict access to the virtual machine and to upload any outstanding virtual disk changes. Once the agent reports that the virtual disk files are in synchronization, the IT professional connects to the copy of the virtual machine on the IT storage server and carries out whatever tasks are needed. Once finished, the host agent on the user's machine streams back the changes from the IT server onto the virtual disk and unlocks the virtual machine so that the user can resume using it.

Figure 10:
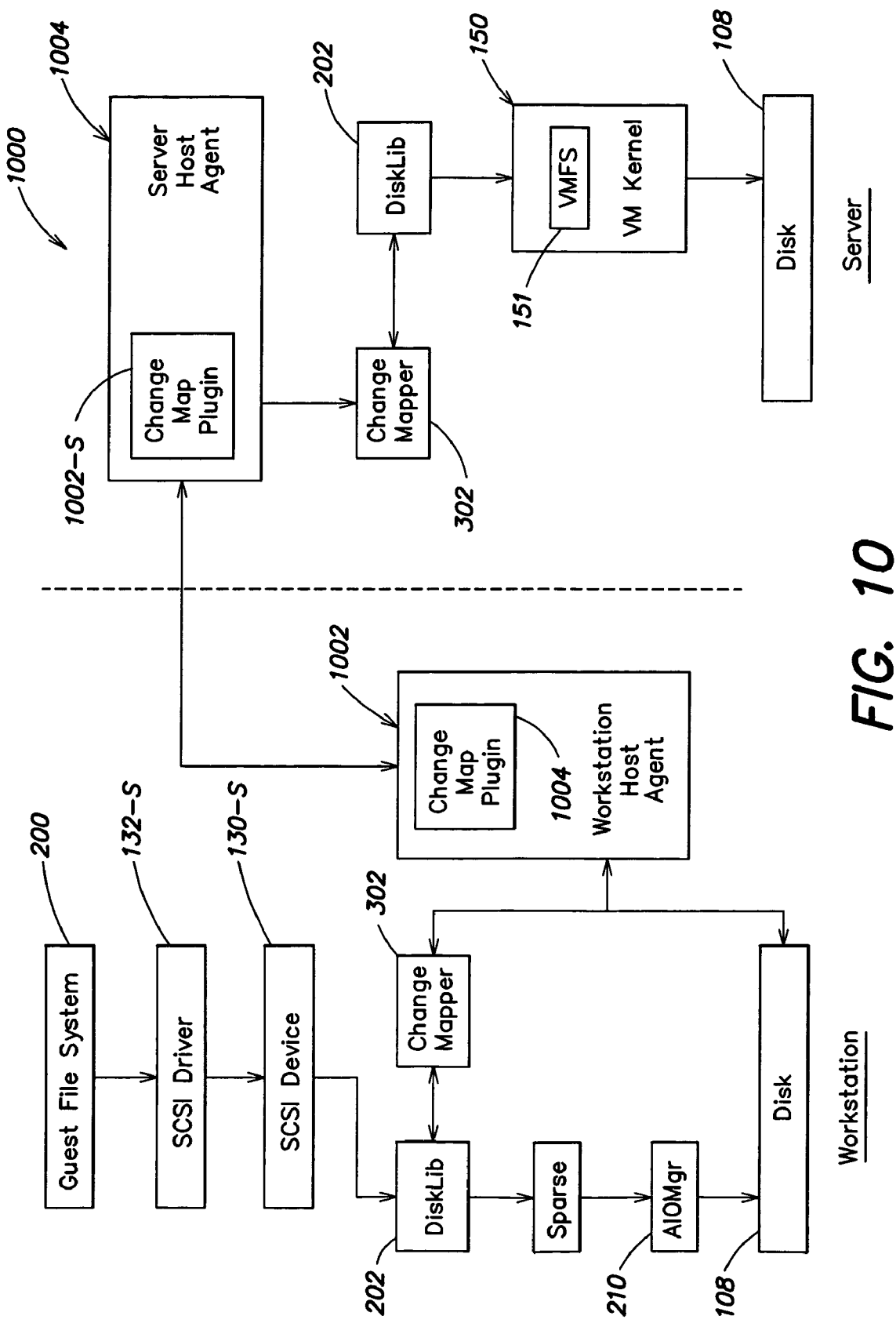
FIG. 10 is a block diagram illustration of a system for implementing disaster recovery in accordance with another embodiment of the present invention.

As shown in FIG. 10, a system 1000 for implementing disaster recovery is presented. In this example, a client is running a VMware workstation available from VMware, Inc. of Palo Alto, Calif. and is connected to an ESX Server also available from VMware, Inc. As shown, the client is running a virtual machine that is emulating a SCSI device via the DiskLib process 202 as a sparse virtual disk through the AIO manager 210 function. A workstation host agent 1002 includes a change map plug-in 1004 that monitors the change map and communicates with a corresponding change map plug-in 1002-S on a server host agent 1004 on the server. In an operation between the server host agent 1004 and the workstation 1002, as per one or more embodiments of the present invention, the virtual disk on the client can be replicated on the server. Advantageously, and as discussed above, because the present invention is tracking the changed blocks while the virtual disk is emulated in the client as a sparse virtual disk, on the server, it is replicated as a plain virtual disk via the VMFS 151 function.

While the foregoing description has been with reference to a master virtual machine and a synchronized virtual machine, one of ordinary skill in the art would understand that the roles may be reversed. For example, in the scenario described above where an "offsite" virtual machine is synchronized, any subsequent changes to the "offsite" virtual machine would be sent back to the "base" virtual machine in order to keep the two systems synchronized. Here, the virtual machine that was previously considered the synchronized virtual machine would become the master and the master would become the synchronized virtual machine.

Further, the communications protocol between a master virtual machine and a synchronized virtual machine are well within the understanding of one of ordinary skill in the art. The appropriate drivers and network interfaces, while not disclosed here, would be easily implementable by one of ordinary skill in the art.

Still further, while one scenario presented the master virtual machine and a synchronized virtual machine as being on separate systems connected via the network 10, the present invention is also implementable between different virtual machines that may be implemented on, for example, an ESX Server. As is known, each of these virtual machines is "separate" from the other and therefore synchronization between their virtual disks is advantageous while it may not require network transfers. The issues as to bandwidth and the amount of data being transferred are still relevant.

Still further, in one environment in which the present invention may be applied, the network 10, reference in FIG. 1 may not necessarily be a network but, rather, a computer I/O bus. In one non-limiting example, the master VM 120-M may be on a USB memory "keychain" device and the synchronized VM 120-S is on a computer. The "network" 10 is the path between the local filesystem of machine 120-S and the USB memory device. As one of ordinary skill in the art will understand from the foregoing description, the present invention is directed to the synchronization of two VMs over any medium.

In an alternate embodiment of the present invention, there may be a single "master" virtual disk and multiple "slave" virtual disks, where each of the slaves synchronizes with the master, perhaps on different schedules or with different parameters. In this "multi-slave" embodiment, there would be a disk change map in the master for each slave. Alternatively, a single map or table may include fields in records for each block that track the status of commits to each of the slave virtual disks. Thus, the changes to the slaves would be separately tracked as to when the commits had occurred. Multiple slaves may be useful where there is a slave for home use, as in one scenario set forth above and another slave is a backup. One of ordinary skill in the art will understand how any of the above described embodiments of the present invention would be implemented in a multi-slave environment.

Further, it is noted that most operating systems found on physical machines have file system drivers that allow for monitoring of writes to a disk. Thus, one of ordinary skill in the art will understand that the change mapper could be hooked into the file system in order to keep a virtual machine's virtual disk synchronized with a physical disk and, therefore, provide a backup to the physical machine.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g. diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results.

What is claimed is:

1. A method of synchronizing a first virtual disk (VD) on a first virtual machine (VM) with a second virtual disk on a second VM, wherein each of the first and second VD comprises a plurality of sectors, the sectors on the first VD being in a direct corresponding relationship with the sectors on the second VD, the method comprising:
 maintaining a first record of a plurality of entries corresponding to a plurality of blocks, where each block corresponds to one or more sectors of the first VD;
 marking a first record entry for the corresponding block for each sector in the first VD that has been written to since a last second VD synch event;
 upon initiation of a second VD synch event, transmitting the first record from the first VM to the second VM;
 receiving, from the second VM, second VD information regarding each of the one or more marked entries in the first record; and
 for each marked entry:
 the first VM determines, as a function of the respective second VD information, whether or not to send data from the first VD, from the one or more sectors corresponding to the specific block for the entry, to the second VM,
 wherein initiating the second VD synch event comprises:
 monitoring a cumulative amount of data represented by sectors corresponding to the blocks in the marked first record entries;
 comparing the cumulative amount of data to a threshold level; and
 if the cumulative amount of data is not less than the threshold, initiating the second VD synch event.

2. The method of claim 1, wherein:
 determining the second VD information comprises:
 for each marked entry in the first record, calculating a second VD hash value over the data in the sectors of the second VD corresponding to the block in the marked entry, and
 returning the calculated second VD hash values to the first VM; and
 determining whether or not to send data from the first VD from the one or more sectors corresponding to the specific block to the second VM comprises:
 for each marked entry in the first record, calculating a first VD hash value over the data in the sectors of the first VD corresponding to the block in the marked entry, comparing the first VD hash value to the second VD hash value and if the first and second VD hash values are not equal, sending the data from the first VD from the one or more sectors corresponding to the specific block to the second VM.

3. The method of claim 2, wherein determining whether or not to send data from the first VD from the one or more sectors corresponding to the specific block to the second VM further comprises:
 for each identified block:
 determining whether the corresponding data is the same as data that has already been transmitted for another identified block, and
 if the data is a duplicate, sending an indication of the another identified block instead of the corresponding data along with a copy identifier for the current block.

4. The method of claim 1, further comprising:
 for each marked entry in the first record, calculating a first VD hash value over the data in the sectors of the first VD corresponding to the block in the marked entry; and
 sending the calculated first VD hash values to the second VM,
 wherein the second VD information is determined by:
 for each marked entry in the first record, calculating a second VD hash value over the data in the sectors of the second VD corresponding to the block in the marked entry; and
 comparing the first VD hash value to the second VD hash value for corresponding blocks and if the first and second VD hash values are not equal, then the second VD information identifies the corresponding block as one for which the corresponding data on the first VD should be sent and if the first and second VD hash values are equal then the second VD information identifies the corresponding block as one for which the corresponding data on the first VD need not be sent.

5. The method of claim 4, further comprising:
 committing the first VD data received from the first VM to the second VD at corresponding sectors on the second VD.

6. The method of claim 1, wherein the threshold is a function of at least one of:
 a maximum amount of data that can be transmitted;
 a bandwidth value of a connection between the first and second VM;
 an amount of time in which the synchronization must be completed;
 a first time of day at which the synchronization must be started; and
 a second time of day by which the synchronization must be completed.

7. The method of claim 6, further comprising:
 monitoring a time at which a block of data in the first VD was written to.

8. The method of claim 1, further comprising:
 for each marked entry in the first record, calculating a first VD hash value over the data in the sectors of the first VD corresponding to the block in the marked entry, and
 returning the calculated first VD hash values to the second VM; and
 determining the second VD information comprises:
 for each marked entry in the first record, calculating a second VD hash value over the data in the sectors of the second VD corresponding to the block in the marked entry,
 comparing the first VD hash value to the second VD hash value and if the first and second VD hash values are not equal, configuring the second VD information to indicate that the data from the first VD from the one or more sectors corresponding to the specific block should be sent to the second VM.

9. The method of claim 1, wherein a third VD is provided on a third VM, the third VD comprising a plurality of sectors, the sectors on the third VD being in a direct corresponding relationship with the sectors on the first VD and the second VD, the method further comprising:
   maintaining a second record of a plurality of entries corresponding to a plurality of blocks, where each block corresponds to one or more sectors of the first VD;
   marking a second record entry for the corresponding block for each sector in the second VD that has been written to since a last synch event;
   upon initiation of a current synch event, transmitting the second record from the first VM to the third VM;
   receiving, from the third VM, third VD information regarding each of the one or more marked entries in the second record; and
   for each marked entry:
      the first VM determines, as a function of the respective third VD information, whether or not to send data from the first VD, from the one or more sectors corresponding to the specific block for the entry, to the third VM.

10. The method of claim 9, wherein:
   determining the third VD information comprises:
   for each marked entry in the second record, calculating a third VD hash value over the data in the sectors of the third VD corresponding to the block in the marked entry, and
   returning the calculated third VD hash values to the first VM; and
   determining whether or not to send data from the first VD from the one or more sectors corresponding to the specific block to the third VM comprises:
      for each marked entry in the first record, calculating a first VD hash value over the data in the sectors of the first VD corresponding to the block in the marked entry, comparing the first VD hash value to the third VD hash value and if the first and third VD hash values are not equal, sending the data from the first VD from the one or more sectors corresponding to the specific block to the third VM.

11. The method of claim 10, wherein determining whether or not to send data from the first VD from the one or more sectors corresponding to the specific block to the third VM further comprises:
   for each identified block:
      determining whether the corresponding data is the same as data that has already been transmitted for another identified block, and
      if the data is a duplicate, sending an indication of the another identified block instead of the corresponding data along with a copy identifier for the current block.

12. The method of claim 9, further comprising:
   for each marked entry in the second record, calculating a first VD hash value over the data in the sectors of the first VD corresponding to the block in the marked entry; and
   sending the calculated first VD hash values to the third VM, wherein the third VD information is determined by:
      for each marked entry in the second record, calculating a third VD hash value over the data in the sectors of the third VD corresponding to the block in the marked entry; and
      comparing the first VD hash value to the third VD hash value for corresponding blocks and if the first and third VD hash values are not equal, then the third VD information identifies the corresponding block as one for which the corresponding data on the first VD should be sent and if the first and third VD hash values are equal then the third VD information identifies the corresponding block as one for which the corresponding data on the first VD need not be sent.

13. The method of claim 12, further comprising:
   committing the first VD data received from the first VM to the third VD at corresponding sectors on the third VD.

14. The method of claim 9, wherein initiating the third VD synch event comprises:
   monitoring a cumulative amount of data represented by sectors corresponding to the blocks in the marked first record entries;
   comparing the cumulative amount of data to a threshold level; and
   if the cumulative amount of data is not less than the threshold, initiating the third VD synch event.

15. The method of claim 14, wherein the threshold is a function of at least one of:
   a maximum amount of data that can be transmitted;
   a bandwidth value of a connection between the first and third VM;
   an amount of time in which the synchronization must be completed;
   a first time of day at which the synchronization must be started; and
   a second time of day by which the synchronization must be completed.

16. A method of synchronizing a first virtual disk (VD) on a first virtual machine (VM) with a second virtual disk on a second VM, wherein each of the first and second VD comprises a plurality of sectors, the sectors on the first VD being in a direct corresponding relationship with the sectors on the second VD, the method comprising:
   maintaining a first record of a plurality of entries corresponding to a plurality of blocks, where each block corresponds to one or more sectors of the first VD;
   marking a first record entry for the corresponding block for each sector in the first VD that has been written to since a last synch event;
   monitoring a cumulative amount of data represented by sectors corresponding to the blocks in the marked first record entries;
   comparing the cumulative amount of data to a threshold level; and
   if the cumulative amount of data is not less than the threshold then initiating a current synch event, and
   upon initiation of the current synch event:
      transmitting the first record from the first VM to the second VM;
      receiving, from the second VM, additional information regarding each of the one or more marked entries in the first record; and
      for each marked entry:
         the first VM determines, as a function of the respective additional information, whether or not to send data from the first VD, from the one or more sectors corresponding to the specific block for the entry, to the second VM.

17. The method of claim 16, wherein the threshold is a function of at least one of:
   a maximum amount of data that can be transmitted;
   a bandwidth value of a connection between the first and second VM;
   an amount of time in which the synchronization must be completed;
   a first time of day at which the synchronization must be started; and a second time of day by which the synchronization must be completed.

18. The method of claim 16, further comprising:
for each marked entry in the first record, calculating a second VD hash value over the data in the sectors of the second VD corresponding to the block in the marked entry, and
the first VM receiving the calculated second VD hash values as the additional information; and
determining whether or not to send data from the first VD from the one or more sectors corresponding to the specific block to the second VM comprises:
for each marked entry in the first record:
calculating a first VD hash value over the data in the sectors of the first VD corresponding to the block in the marked entry,
comparing the first VD hash value to the second VD hash value; and
if the first and second VD hash values are not equal, sending the data from the first VD from the one or more sectors corresponding to the specific block to the second VM.

19. The method of claim 18, further comprising:
for each identified block:
determining whether the corresponding data is the same as data that has already been transmitted for another identified block, and
if the corresponding data is a duplicate, sending an indication of the another identified block instead of the corresponding data along with a copy identifier for the current block.

20. The method of claim 16, further comprising:
for each marked entry in the first record, calculating a first VD hash value over the data in the sectors of the first VD corresponding to the block in the marked entry; and
sending the calculated first VD hash values to the second VM,
wherein the second VM determining the additional information comprises:
for each marked entry in the first record, calculating a second VD hash value over the data in the sectors of the second VD corresponding to the block in the marked entry; and
comparing the first VD hash value to the second VD hash value for corresponding blocks;
if the first and second VD hash values are not equal, then identifying the corresponding block in the additional information as one for which the corresponding data on the first VD should be sent; and
if the first and second VD hash values are equal, then identifying the corresponding block in the additional information as one for which the corresponding data on the first VD need not be sent.

21. A system for synchronizing a first virtual disk (VD) on a first virtual machine (VM) with a second virtual disk on a second VM, the first VM comprising a first memory containing a master synch program and a first processor operative to execute said master synch program, wherein each of the first and second VD comprises a plurality of sectors, the sectors on the first VD being in a direct corresponding relationship with the sectors on the second VD, the master synch program comprising:
program code for maintaining a first record of a plurality of entries corresponding to a plurality of blocks, where each block corresponds to one or more sectors of the first VD;
program code for marking a first record entry for the corresponding block for each sector in the first VD that has been written to since a last synch event;
program code for, upon initiation of a current synch event, transmitting the first record from the first VM to the second VM;
program code for receiving, from the second VM, additional information regarding each of the one or more marked entries in the first record; and
program code for, for each marked entry:
determining, as a function of the respective additional information, whether or not to send data from the first VD, from the one or more sectors corresponding to the specific block for the entry, to the second VM,
wherein the program code for initiating the current synch event comprises:
program code for monitoring a cumulative amount of data represented by sectors corresponding to the blocks in the marked first record entries;
program code for comparing the cumulative amount of data to a threshold level; and
program code for, if the cumulative amount of data is not less than the threshold, initiating the current synch event.

22. The system of claim 21, wherein the second VM comprises a second memory containing a slave synch program and a second processor operative to execute said slave synch program, and wherein the slave synch program comprises:
program code for, for each marked entry in the first record, calculating a second VD hash value over the data in the sectors of the second VD corresponding to the block in the marked entry, and
program code for returning the calculated second VD hash values to the first VM; and
the program code for determining whether or not to send data from the first VD from the one or more sectors corresponding to the specific block to the second VM comprises
program code for, for each marked entry in the first record:
calculating a first VD hash value over the data in the sectors of the first VD corresponding to the block in the marked entry,
comparing the first VD hash value to the second VD hash value and
if the first and second VD hash values are not equal, sending the data from the first VD from the one or more sectors corresponding to the specific block to the second VM.

23. The system of claim 22, wherein the program code for determining whether or not to send data from the first VD from the one or more sectors corresponding to the specific block to the second VM further comprises:
program code for, for each identified block:
determining whether the corresponding data is the same as data that has already been transmitted for another identified block, and
if the data is a duplicate, sending an indication of the another identified block instead of the corresponding data along with a copy identifier for the current block.

24. The system of claim 21, the master synch program further comprising:
program code for, for each marked entry in the first record, calculating a first VD hash value over the data in the sectors of the first VD corresponding to the block in the marked entry; and
program code for sending the calculated first VD hash values to the second VM,
wherein the additional information is determined by:

for each marked entry in the first record, calculating a second VD hash value over the data in the sectors of the second VD corresponding to the block in the marked entry; and comparing the first VD hash value to the second VD hash value for corresponding blocks and if the first and second VD hash values are not equal, then the additional information identifies the corresponding block as one for which the corresponding data on the first VD should be sent and if the first and second VD hash values are equal then the additional information identifies the corresponding block as one for which the corresponding data on the first VD need not be sent.

25. The system of claim 24, the master synch program further comprising:

program code for committing the first VD data received from the first VM to the second VD at corresponding sectors on the second VD.

26. The system of claim 21, wherein the threshold is a function of at least one of:

a maximum amount of data that can be transmitted;

a bandwidth value of a connection between the first and second VM;

an amount of time in which the synchronization must be completed;

a first time of day at which the synchronization must be started; and a second time of day by which the synchronization must be completed.

27. The system of claim 26, further comprising:

program code for monitoring a time at which a block of data was written to.

28. The system of claim 21, the master synch program further comprising:

program code for, for each marked entry in the first record, calculating a first VD hash value over the data in the sectors of the first VD corresponding to the block in the marked entry, and program code for returning the calculated first VD hash values to the second VM; and program code for determining the additional information comprises:

program code for, for each marked entry in the first record, calculating a second VD hash value over the data in the sectors of the second VD corresponding to the block in the marked entry; and program code for comparing the first VD hash value to the second VD hash value and if the first and second VD hash values are not equal, configuring the additional information to indicate that the data from the first VD from the one or more sectors corresponding to the specific block should be sent to the second VM.

29. A system for synchronizing a first virtual disk (VD) on a first virtual machine (VM) with a second virtual disk on a second VM, the first VM comprising a first memory containing a master synch program and a first processor operative to execute said master synch program, wherein each of the first and second VD comprises a plurality of sectors, the sectors on the first VD being in a direct corresponding relationship with the sectors on the second VD, the master synch program comprising:

program code for maintaining a first record of a plurality of entries corresponding to a plurality of blocks, where each block corresponds to one or more sectors of the first VD;

program code for marking a first record entry for the corresponding block for each sector in the first VD that has been written to since a last synch event;

program code for monitoring a cumulative amount of data represented by sectors cumulative to the blocks in the marked first record entries;

program code for comparing the cumulative amount of data to a threshold level; and program code for, if the cumulative amount of data is not less than the threshold then initiating a current synch event, and program code for, upon initiation of the current synch event:

transmitting the first record from the first VM to the second VM;

receiving, from the second VM, additional information regarding each of the one or more marked entries in the first record; and for each marked entry:

determining, as a function of the respective additional information, whether or not to send data from the first VD, from the one or more sectors corresponding to the specific block for the entry, to the second VM.

30. The system of claim 29, wherein the threshold is a function of at least one of:

a maximum amount of data that can be transmitted;

a bandwidth value of a connection between the first and second VM;

an amount of time in which the synchronization must be completed;

a first time of day at which the synchronization must be started; and a second time of day by which the synchronization must be completed.

31. The system of claim 29, wherein the second VM comprises a second memory containing a slave synch program and a second processor operative to execute said slave synch program, and wherein the slave synch program comprises:

program code for, for each marked entry in the first record, calculating a second VD hash value over the data in the sectors of the second VD corresponding to the block in the marked entry, and program code for returning the calculated second VD hash values to the first VM, wherein the program code for determining whether or not to send data from the first VD from the one or more sectors corresponding to the specific block to the second VM comprises:

program code for, for each marked entry in the first record:

calculating a first VD hash value over the data in the sectors of the first VD corresponding to the block in the marked entry;

comparing the first VD hash value to the second VD hash value; and sending the data from the first VD from the one or more sectors corresponding to the specific block to the second VM if the first and second VD hash values are not equal.

32. The system of claim 29, wherein the master synch program further comprises:

program code for, for each marked entry in the first record, calculating a first VD hash value over the data in the sectors of the first VD corresponding to the block in the marked entry; and program code for sending the calculated first VD hash values to the second VM, wherein the second VM comprises a second memory containing a slave synch program and a second processor operative to execute said slave synch program comprising a method wherein determining the additional information comprises:
  for each marked entry in the first record, calculating a second VD hash value over the data in the sectors of the second VD corresponding to the block in the marked entry; and
  comparing the first VD hash value to the second VD hash value for corresponding blocks;
  if the first and second VD hash values are not equal, then the additional information identifies the corresponding block as one for which the corresponding data on the first VD should be sent; and
  if the first and second VD hash values are equal then the additional information identifies the corresponding block as one for which the corresponding data on the first VD need not be sent.

33. The system of claim 29, the master synch program further comprising:
  program code for, for each marked entry in the first record, calculating a first VD hash value over the data in the sectors of the first VD corresponding to the block in the marked entry, and
  program code for returning the calculated first VD hash values to the second VM,
  wherein the second VM comprises a second memory containing a slave synch program and a second processor operative to execute said slave synch program comprising program code for determining the additional information comprising:
    program code for, for each marked entry in the first record, calculating a second VD hash value over the data in the sectors of the second VD corresponding to the block in the marked entry; and
    program code for comparing the first VD hash value to the second VD hash value and if the first and second VD hash values are not equal, configuring the additional information to indicate that the data from the first VD from the one or more sectors corresponding to the specific block should be sent to the second VM.

34. A method of synchronizing a first physical disk on a first machine with a first virtual disk (VD) on a first virtual machine (VM), wherein each of the first physical disk and the first VD comprises a plurality of sectors, the sectors on the first VD being in a direct corresponding relationship with the sectors on the first physical disk, the method comprising:
  maintaining a first record of a plurality of entries corresponding to a plurality of blocks, where each block corresponds to one or more sectors of the first physical disk;
  marking a first record entry for the corresponding block for each sector in the first physical disk that has been written to since a last first VD synch event;
  upon initiation of a first VD synch event, transmitting the first record from the first machine to the first VM;
  receiving, from the first VM, first VD information regarding each of the one or more marked entries in the first record; and
  for each marked entry:
    the first machine determines, as a function of the respective first VD information, whether or not to send data from the first physical disk, from the one or more sectors corresponding to the specific block for the entry, to the first VM,
  wherein initiating the first VD synch event comprises:
    monitoring a cumulative amount of data represented by sectors corresponding to the blocks in the marked first record entries;
    comparing the cumulative amount of data to a threshold level; and
    if the cumulative amount of data is not less than the threshold, initiating the first VD synch event.

35. The method of claim 34, wherein:
  determining the first VD information comprises:
    for each marked entry in the first record, calculating a first VD hash value over the data in the sectors of the first VD corresponding to the block in the marked entry, and
    returning the calculated first VD hash values to the first machine; and
  determining whether or not to send data from the first physical disk from the one or more sectors corresponding to the specific block to the first VM comprises:
    for each marked entry in the first record, calculating a first physical disk hash value over the data in the sectors of the first physical disk corresponding to the block in the marked entry, comparing the first physical disk hash value to the first VD hash value and if the first physical disk hash value and second VD hash values are not equal, sending the data from the first physical disk from the one or more sectors corresponding to the specific block to the first VM.

36. The method of claim 35, wherein determining whether or not to send data from the first physical disk from the one or more sectors corresponding to the specific block to the first VM further comprises:
  for each identified block:
    determining whether the corresponding data is the same as data that has already been transmitted for another identified block, and
    if the data is a duplicate, sending an indication of the another identified block instead of the corresponding data along with a copy identifier for the current block.

37. The method of claim 34, further comprising:
  for each marked entry in the first record, calculating a first physical disk hash value over the data in the sectors of the first physical disk corresponding to the block in the marked entry; and
  sending the calculated first physical disk hash values to the first VM,
  wherein the first VD information is determined by:
    for each marked entry in the first record, calculating a first VD hash value over the data in the sectors of the first VD corresponding to the block in the marked entry; and
    comparing the first physical disk hash value to the first VD hash value for corresponding blocks and if the first physical disk hash value and the first VD hash values are not equal, then the first VD information identifies the corresponding block as one for which the corresponding data on the first physical disk should be sent and if the first physical disk hash value and the second VD hash values are equal then the first VD information identifies the corresponding block as one for which the corresponding data on the first physical disk need not be sent.

38. The method of claim 37, further comprising:
  committing the first physical disk data received from the first machine to the first VD at corresponding sectors on the first VD.

39. The method of claim 34, wherein the threshold is a function of at least one of:
- a maximum amount of data that can be transmitted;
- a bandwidth value of a connection between the first machine and the first VM;
- an amount of time in which the synchronization must be completed;
- a first time of day at which the synchronization must be started; and
- a second time of day by which the synchronization must be completed.

40. The method of claim 39, further comprising:
monitoring a time at which a block of data in the first physical disk was written to.

* * * * *